United States Patent [19]

Boros

[11] 4,182,950
[45] Jan. 8, 1980

[54] DEEP FILL WELDING JOINT CONFIGURATION AND WELDING METHOD

[76] Inventor: Lawrence A. Boros, 4345 Bunker Rd., West Bloomfield, Mich. 48033

[21] Appl. No.: 868,955

[22] Filed: Jan. 12, 1978

Related U.S. Application Data

[63] Continuation of Ser. No. 648,598, Jan. 12, 1976, abandoned, which is a continuation of Ser. No. 405,662, Oct. 11, 1973, abandoned.

[51] Int. Cl.² .................. B23K 9/00; F16L 13/02
[52] U.S. Cl. .................. 219/137 R; 219/60 R; 219/61; 285/286; 403/272
[58] Field of Search .................. 219/137 R, 60 R, 61, 219/104, 105; 285/286; 403/270–272

[56] References Cited

U.S. PATENT DOCUMENTS

| | | | |
|---|---|---|---|
| 1,810,902 | 6/1931 | Burnish | 219/61 |
| 2,945,942 | 7/1960 | Flynn | 219/137 R |
| 3,003,601 | 10/1961 | Ott | 28/164 |
| 3,123,702 | 3/1964 | Keidel | 219/76.12 |
| 3,137,782 | 6/1964 | Rieppel | 219/61 |
| 3,268,248 | 8/1966 | Chambers | 285/286 |

FOREIGN PATENT DOCUMENTS 656696  8/1951  United Kingdom .................. 285/286

Primary Examiner—E. A. Goldberg

[57] ABSTRACT

A weld joint configuration facilitating the connection of two closely positioned workpieces having spaced apart end surfaces comprising sidewalls of a weld joint space. One of said workpieces has a tongue projecting therefrom that is received at least in part in a groove formed in the other of the workpieces. The interface between the tongue and a surface of the other workpiece partially defining the groove comprises a weld joint parting line. An extension projecting from at least one of the workpieces provides workpiece material located between this parting line and the weld joint space. When the workpieces are welded electrode material and the extensions are mixed to form a composite weld having a root portion with a parting line extending substantially tangentially from the root portion.

5 Claims, 5 Drawing Figures

DEEP FILL WELDING JOINT CONFIGURATION AND WELDING METHOD

This is a continuation, of application Ser. No. 648,598, filed Jan. 12, 1976, now abandoned, which is a continuation of Ser. No. 405,662 filed Oct. 11, 1973, now abandoned.

BACKGROUND OF THE INVENTION

It is well known in the welding art that when it is desired to join with a high strength weld two workpieces of substantial thickness, it may be necessary to utilize the so-called "deep fill" welding technique. Such deep fill welding includes the formation of the workpiece extremities to be joined in configurations defining a weld joint space between the workpieces and extending partially through the thicknesses of the workpiece. The presence of a weld joint space allows a deep satisfactory weld to be accomplished since the welding electrode may be inserted deeply between the workpieces to generate the requisite heat at such a location to promote weld penetration and complete fusion. In deep fill welding the depth of the weld joint space is substantially greater than its width.

Also, it is well known that in welds of substantial width and depth, a tendency for weld porosity occurs along the centerline of the weld. In order to minimize deleterious effect due to this phenomenon, it is possible in deep fill welds utilizing a weld joint space to include pilot means in the weld joint configuration that result in the weld parting line extending from the finished weld tangentially from the weld root rather than coaxially along the long axis of the weld. Such pilot means also aid in the positioning of the workpieces prior to welding.

Despite these advantages, deep fill welds sometimes fail and weld depths are limited by the difficulty in causing sufficient heat to collect at the corners of the root of the weld joint space. This can result in insufficient fusion at these corners, porosity in the weld and resultant stress risers that may initiate cracks leading to failure.

It is an object of this invention to provide a deep fill welding joint configuration, deep fill welding method and product resulting from such a method that retain all the advantages of conventional deep fill welding as detailed above, but also promote welds having depths not heretofore contemplated using commercially available arc welding equipment. Such extremely deep welds especially are useful in the fabrication of products of large metal thicknesses that are subject to large bending and twisting loads. An example of such a product is a drive axle housing included in heavy on and off highway vehicles.

SUMMARY OF THE INVENTION

A weld joint configuration according to this invention facilitates the joining of two closely positioned workpieces by a deep fill weld of exceptional depth. The workpieces have spaced apart end surfaces comprising sidewalls of a weld joint space. One of said workpieces has a tongue projecting therefrom that is received at least in part in a groove formed in the other of the workpieces. The interface between the tongue and a surface of the other workpiece partially defining the groove comprises a weld joint parting line. An extension projecting from at least one of the workpieces provides workpiece material located between this parting line and the weld joint space.

The method of this invention comprises welding together two workpieces having the weld joint configuration described above and includes the steps of positioning an electrode formed from weld material in the weld joint space and arcing electrical current between the electrode and the workpiece. The heat generated by this arcing causes a melting of portions of the electrode material and the workpiece including all the workpiece material between the parting line and the weld joint space. The melted weld and workpiece materials are mixed to promote positioning and form a composite weld having a root portion with the parting line extending substantially tangentially from the root portion.

This invention also includes the composite weld production fabricated according to the inventive method described in the preceding paragraph.

DETAILED DESCRIPTION OF THE INVENTION

Figure 1:
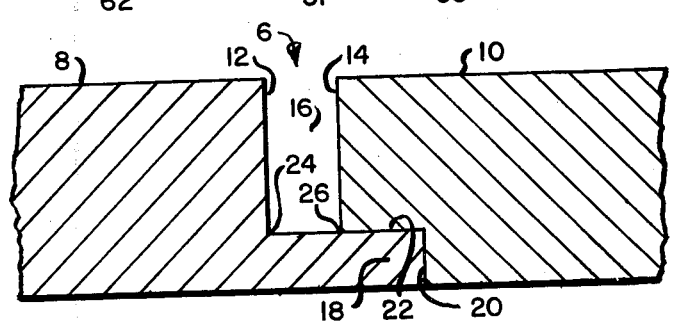
FIG. 1 is a partial view of two workpieces preparatory to the deep fill welding thereof, which workpieces are formed with a conventional weld joint configuration.

Referring now in detail to the drawings and in particular to FIG. 1 thereof, the numeral 6 denotes generally a deep fill weld joint configuration of the conventional type used to facilitate the joining of workpieces 8 and 10. The workpieces 8 and 10 have end surfaces 12 and 14 respectively that are spaced apart and comprise the sidewalls of a weld joint space 16. Space 16 will be filled with weld material during successive weld passes in the actual welding operation.

Workpieces 8 and 10 are formed wth pilot means including tongue 18 projecting from an extremity of end surface 12 and partially received in a groove 20 formed in the end surface 14 of workpiece 10. It readily may be appreciated that the tongue and groove arrangement shown facilitates the positioning of the workpieces prior to welding and since the tongue 18 bottoms in the groove 20, insures the desired spaced apart relationship of the surfaces 12 and 14. The horizontally extending interface between the tongue 18 and the downwardly facing surface of workpiece 10 partially defining groove 20 comprise the parting line 22 that leads laterally to the weld space 16. Such a parting line orientation avoids the presence of a parting line coaxial with the longitudinal axis of the weld whereat porosity and lack of fusion occur.

As readily may be appreciated, if the depth of the weld joint space 16 exceeds a certain magnitude relative to its width, great difficulty is encountered in achieving adequate weld penetration because of the difficulty in concentrating sufficient heat at root corners 24 and 26 of the weld joint space 16. This is particularly true in deep fill weld joints where the oppositely disposed sidewalls are substantially parallel and the depth of the weld joint space is at least two times the width of the weld joint space.

Figure 2:
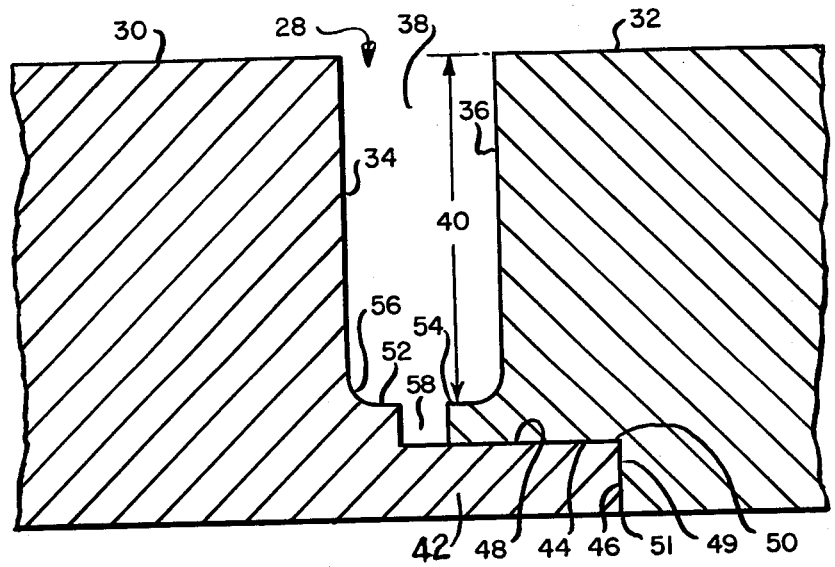
FIG. 2 is a view similar to FIG. 1 but showing one embodiment of the unique weld joint configuration of this invention.
Figure 3:
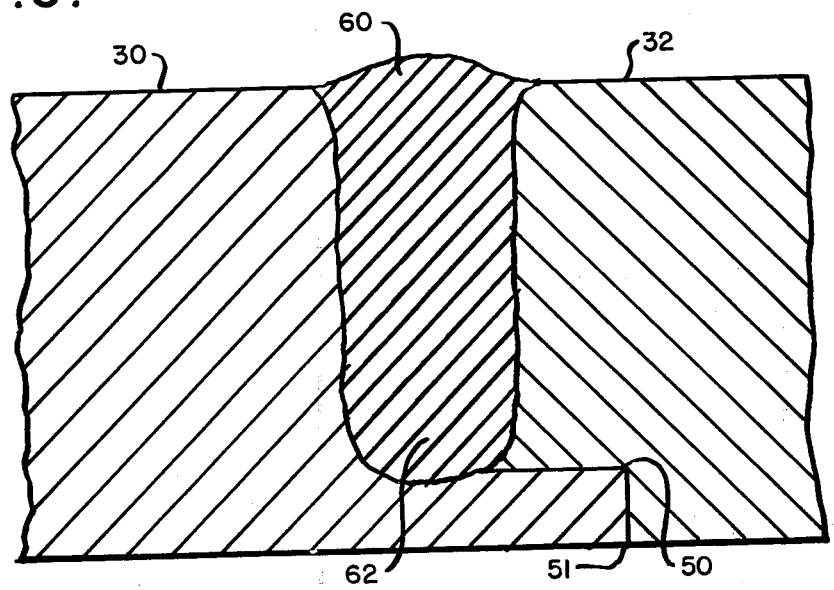
FIG. 3 is a view of the workpiece of FIG. 2 subsequent to the welding together thereof according to the method of this invention.

Referring now to FIGS. 2 and 3 of the drawings the numeral 28 illustrates a first embodiment of a weld joint configuration according to this invention. Workpieces 30 and 32, which may be flat plates to be joined by a straight line weld or tubular elements to be joined by a circumferential weld, have end surfaces 34 and 36 that are spaced apart and comprise the sidewalls of weld joint space 38. Although when the sidewalls 34 and 36 are parallel as illustrated a superior weld is formed, it should be understood that these sidewalls may be tapered or inclined relative to one another without departing from the scope of this invention. The numeral 40 indicates the depth dimension of the weld joint space 38.

Workpiece 30 has a tongue 42 extending therefrom at one extremity of surface 34. This tongue partially is received in a groove formed in workpiece 32 that is defined by a downwardly facing groove surface 44, as viewed in the drawings, and a groove end surface 46. The tongue 42 has a top surface 48 as viewed in the drawings that cooperates with surface 44 to comprise a laterally extending parting line 50. The end surface 49 of tongue 42 interfaces with surface 46 to comprise a vertical parting line 51 that intersects parting line 50. As in the configuration illustrated in FIG. 1 and discussed above, the tongue and groove arrangement aids in the positioning of the workpieces and insures the proper spacing and width of the space 38.

Projecting from surface 34 of workpiece 30 adjacent tongue 42 is a step shoulder 52. Shoulder 52 partially defines the bottom end of weld joint space 38 and blends into sidewall 34 at fillet 56. A similar shoulder 54 projects from surface 36 of workpiece 32. Shoulders 52 and 54 are spaced apart as at 58. It is important that this spaced apart relationship be maintained in order to decrease the necessity for close tolerances in the formation of these shoulders. In this manner, only the tolerances of tongue 42 and the cooperating groove in workpiece 32 need closely to be controlled in order to insure the correct width of space 38.

During the welding operation, an electrode of weld material is inserted into the space 38. As electrical arcing occurs between the weld electrode and the workpieces, concentrations of heat occur in the shoulders 52 and 54 because of their proximity to the electrode and because of the general conductive characteristics of heat. These shoulders 52 and 54 thus easily are melted along with limited portions of the spaced sidewalls 34 and 36 and are mixed with melted weld material during successive weld passes to form the weld 60 that joins together workpieces 30 and 32.

The advantages of the weld configuration of FIG. 2 may be appreciated if it is assumed that dimension 40 is the greatest depth to which a deep fill weld conventionally may be made before insufficient heat at root corners 24 and 26 (FIG. 1) causes porosity and incomplete fusion at these locations. The presence of shoulders 50 and 52, which become heat accumulation locations, allow weld 60 to have a depth equal to the dimension 40 plus the thickness of the shoulders 52 and 54, thus yielding a greater overall weld depth and attendant strength. It should be noted that despite this advantage of the weld configuration 28 and the deep weld method of this invention and the product obtained therefrom, the weld parting line 50 extends laterally and substantially tangentially from the root 62 of weld 60 as in conventional welding. A vertical parting line near the center of the weld thus completely is avoided.

Figure 4:
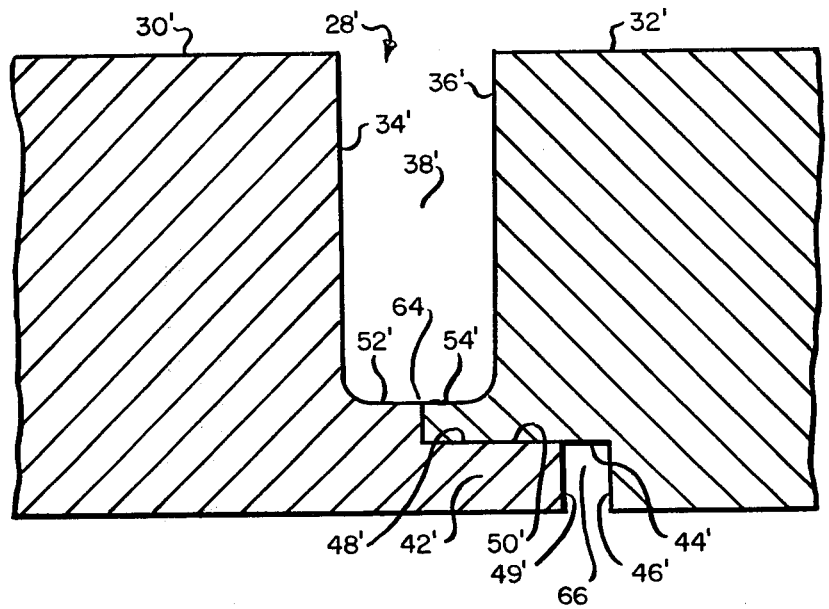
FIG. 4 is a view similar to FIG. 2 but showing a second embodiment of the weld joint configuration of this invention.
Figure 5:
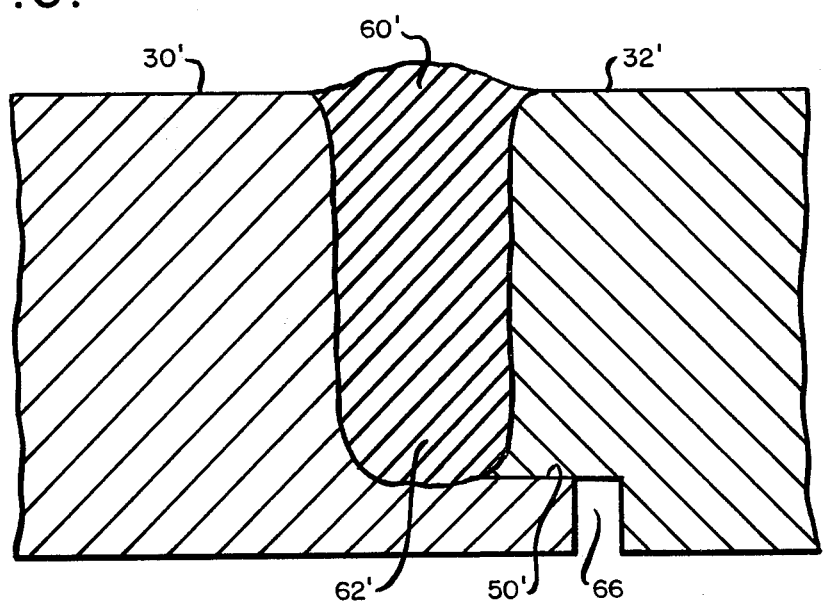
FIG. 5 is a view of the workpiece of FIG. 4 subsequent to the welding together thereof according to the method of this invention.

Reference now is made to FIGS. 4 and 5 wherein like parts to those illustrated in FIGS. 2 and 3 are identified by the same but primed reference numerals. Numeral 28' indicates in general a second embodiment of weld joint configuration yielding all of the advantages of the embodiment of FIGS. 2 and 3 described above. However, in the embodiment of FIGS. 4 and 5, positioning of the work is not accomplished by the interrelationship between tongue 42' and the groove defined by surfaces 44' and 46'. Rather, the work is positioned by contact between shoulders 52' and 54', the interface of which forms a vertical parting line 64 that intersects with the laterally extending parting line 50'. As readily is apparent, upon the melting of the workpiece material of shoulders 52' and 54', parting line 64 ceases to exist and weld 60' extends to a depth sufficient that parting line 50' extends substantially tangentially therefrom as may be seen in FIG. 5.

It is important that tongue 42' and the groove in workpiece 32' be formed such that tongue end surface 49' is spaced from groove surface 46' as at 66. This obviates the necessity for closely controlling the dimensions of the tongue and groove and reduces the cost of preparing the workpieces for welding.

It thus may be seen that this invention provides a weld joint configuration allowing the formation of deep fill welds to depths greater than conventional practice with resulting increases in the strength and reliability of such welds. This is accomplished by utilizing this novel configuration in the method of this invention wherein the difficulty of insufficient heat at the corners of the weld joint space is not encountered. This invention further provides a novel welded product fabricated according to this method.

I claim:

1. A deep fill weld joint configuration facilitating connecting two workpieces having spaced apart end surfaces that comprise opposed sidewalls of a weld joint space, a first of said workpieces being formed with a tongue projecting from an extremity of said first workpiece end surface, said tongue being at least partially received in a groove formed in the end surface of the second of said workpieces at an extremity thereof and closing the bottom of said weld joint space, the surface of the tongue opposite the weld joint space being in substantially the same plane as a major surface of said second workpiece an interface between said tongue and a workpiece surface partially defining said groove and comprising a weld joint parting line, said spaced apart end surfaces being substantially parallel and the depth of said weld joint space being at least two times greater than its width, and a part of each workpiece forming an extension shoulder projecting from its respective end surface adjacent said tongue, one of said extension shoulders providing workpiece heat accumulation material located between said parting line and said weld joint space and the other said shoulder extension providing workpiece heat accumulation material located between an extension of said parting line and said weld joint space, with said parting line oriented to extend substantially tangentially with the root of the weld.

2. The weld joint configuration defined by claim 1, wherein each of said shoulder extensions comprises a step projection.

3. The weld joint configuration defined by claim 1, wherein said step projections extend into close proximity with one another.

4. The weld joint configuration defined by claim 1, wherein said step projections contact one another and define the entirety of the weld joint space end wall.

5. A method of joining two workpieces together by welding comprising the steps of: forming an end of one workpiece to provide a substantially flat sidewall, a tongue projecting from said sidewall and a step projection at the intersection of said sidewall and said tongue, forming one end of the other said workpiece to provide a substantially flat sidewall, a groove adapted to receive at least part of said tongue, and a step projection between said groove and said sidewall, fitting said formed ends of said workpieces together to provide a weld joint space having substantially parallel sidewalls and a depth at least two times greater than its width, said weld joint space being closed at one end by said tongue at least partly received in said groove, said tongue and said groove having interfacing surfaces which define a weld joint parting line, and each said step projection filling a corner at the closed end of said weld joint space, inserting an electrode formed of weld material in said weld joint space proximate said step projections, arcing electrical current between said electrode and said workpieces, melting a portion of said electrode weld material and said workpieces, including said step projections, mixing the melted weld and step projection material to form a root at the bottom of said weld joint space with said parting line extending substantially tangentially from said root, and filling said space with melted weld and workpiece material to form a composite weld of substantially uniform thickness.

* * * * *